United States Patent
Zhang et al.

(10) Patent No.: US 9,500,764 B2
(45) Date of Patent: Nov. 22, 2016

(54) SCANNING IMAGING SYSTEMS

(71) Applicant: Nuctech Company Limited, Beijing (CN)

(72) Inventors: Li Zhang, Beijing (CN); Jinyu Zhang, Beijing (CN); Qingping Huang, Beijing (CN); Hu Tang, Beijing (CN); Hui Ding, Beijing (CN); Qianlu Ren, Beijing (CN)

(73) Assignee: Nuctech Company Limited, Beijing (CN)

( * ) Notice: Subject to any disclaimer, the term of this patent is extended or adjusted under 35 U.S.C. 154(b) by 5 days.

(21) Appl. No.: 14/711,955

(22) Filed: May 14, 2015

(65) Prior Publication Data

US 2015/0331140 A1    Nov. 19, 2015

(30) Foreign Application Priority Data

May 14, 2014   (CN) .......................... 2014 1 0203124

(51) Int. Cl.
    *G01V 5/00*    (2006.01)
(52) U.S. Cl.
    CPC ............. *G01V 5/005* (2013.01); *G01V 5/0016* (2013.01)
(58) Field of Classification Search
    CPC ........................... G01V 5/005; G01V 5/0016
    USPC ..................................................... 378/51, 57
    See application file for complete search history.

(56) References Cited

U.S. PATENT DOCUMENTS 6,370,223 B1 * 4/2002 Gleason ................. G01B 15/00
                                                                378/54
2004/0062346 A1 * 4/2004 Fernandez ........... G01V 5/0058
                                                                378/41
2005/0276376 A1   12/2005 Eilbert
2010/0230242 A1 *  9/2010 Basu ..................... G01N 23/046
                                                                198/502.2

FOREIGN PATENT DOCUMENTS

WO    2004/021122 A2    3/2004

OTHER PUBLICATIONS

Extended European Search Report for European Patent Application No. 15167890.1, dated Oct. 27, 2015, 10 pages.

* cited by examiner

*Primary Examiner* — Michael Maskell
(74) *Attorney, Agent, or Firm* — Westman, Champlin & Koehler, P.A.

(57) ABSTRACT

The present disclosure discloses a scanning imaging system, comprising a transportation apparatus, a first imaging system, and a second imaging system. A distance between a ray beam from a first ray generator of the first imaging system and a ray beam from a second ray generator of the second imaging system in the transportation direction is roughly L. A controller is configured to acquire, based on a count value of the encoding counter module, a correspondence relationship between data in a position of the inspected object in the transportation direction which is collected by the first imaging system and data in the position of the inspected object in the transportation direction which is collected by the second imaging system, wherein a difference between a count value of the encoder corresponding to the data in the position which is collected by the first imaging system and a count value of the encoder corresponding to the data in the position which is collected by the second imaging system is roughly L/D. The present disclosure can achieve alignment of the DR data image and the CT data image in a simple manner.

9 Claims, 2 Drawing Sheets

SCANNING IMAGING SYSTEMS

TECHNICAL FIELD

The present disclosure relates to a scanning imaging system, and in particular, to a scanning imaging system comprising a Digital Radiography (DR) imaging system and a Computed Tomography (CT) imaging system.

BACKGROUND

Currently, DR imaging systems and CT imaging systems are widely applied, especially in the field of security inspection.

SUMMARY

The purpose of the present disclosure is to provide a scanning imaging system, and in particular, a scanning imaging system comprising a DR imaging system and a CT imaging system, to achieve alignment of data of the DR imaging system and the CT imaging system in a simple manner.

According to an aspect of the present disclosure, the present disclosure provides a scanning imaging system, comprising: a transportation apparatus configured to transport an inspected object in a transportation direction; a first imaging system comprising a first ray generator and first detectors; a second imaging system arranged on the downstream of the first imaging system in the transportation direction, the second imaging system comprising a second ray generator and second detectors, wherein a distance between a ray beam from the first ray generator of the first imaging system and a ray beam from the second ray generator of the second imaging system in the transportation direction is roughly L; an encoder configured to output a signal whenever the transportation apparatus travels a predetermined distance D; an encoding counter module configured to count the output signal of the encoder; and a controller configured to acquire, based on a count value of the encoding counter module, a correspondence relationship between data in a position of the inspected object in the transportation direction which is collected by the first imaging system and data in the position of the inspected object in the transportation direction which is collected by the second imaging system, wherein a difference between a count value of the encoder corresponding to the data in the position which is collected by the first imaging system and a count value of the encoder corresponding to the data in the position which is collected by the second imaging system is roughly L/D.

According to an aspect of the present disclosure, the present disclosure provides a scanning imaging system, comprising: a transportation apparatus configured to transport an inspected object in a transportation direction; a first imaging system comprising a first ray generator and first detectors; a second imaging system arranged on the downstream of the first imaging system in the transportation direction, the second imaging system comprising a second ray generator and second detectors, wherein a distance between a ray beam from the first ray generator of the first imaging system and a ray beam from the second ray generator of the second imaging system in the transportation direction is roughly L; an encoder configured to output a signal whenever the transportation apparatus travels a predetermined distance D; an encoding counter module configured to count the output signal of the encoder; and a controller configured to acquire, based on a count value of the encoding counter module, a correspondence relationship between data in a position of the inspected object in the transportation direction which is collected by the first imaging system and data in the position of the inspected object in the transportation direction which is collected by the second imaging system, wherein a difference between the count value of the encoder corresponding to the data in the position collected by the first imaging system and the count value of the encoder corresponding to the data in the position collected by the second imaging system is roughly $(L-\Delta)/D+d$, wherein $\Delta$ is a compensation value, and the second imaging system starts to collect data from a position where a distance between the forefront of the inspected object and the ray beam from the second ray generator of the second imaging system is $\Delta$, and d is a correction value, and is equal to a count value of the encoder for the inspected object from the time when the second imaging system starts to collect data to the time when the forefront of the inspected object arrives at the ray beam from the second ray generator of the second imaging system.

According to an aspect of the present disclosure, the transportation apparatus comprises a transportation belt, and the encoder outputs a signal whenever the transportation belt travels a predetermined distance D.

According to an aspect of the present disclosure, the first imaging system is a Digital Radiography (DR) imaging system, and the second imaging system is a Computed Tomography (CT) imaging system.

According to an aspect of the present disclosure, the first imaging system is a CT imaging system, and the second imaging system is a DR imaging system.

According to an aspect of the present disclosure, the correction value d is obtained from a count value of the encoder corresponding to the projection data of a non-object part in the sinogram obtained by the CT imaging system.

With the scanning imaging system according to the present disclosure, alignment of DR data images and CT data images can be achieved. With a correction value, an accurate alignment effect can be acquired.

DETAILED DESCRIPTION

The present disclosure will be further described below in conjunction with accompanying drawings and specific implementations.

Figure 1:
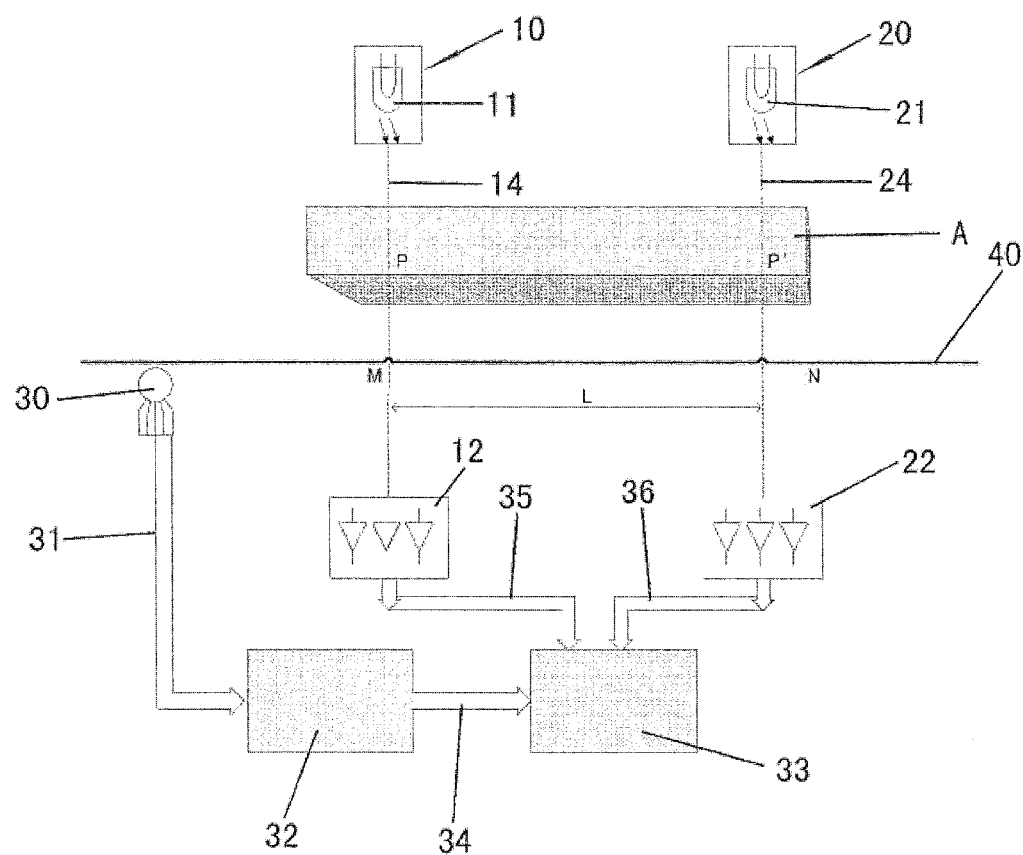
FIG. 1 is a diagram of a scanning imaging system according to an embodiment of the present disclosure.

As shown in FIG. 1, a scanning imaging system according to an embodiment of the present disclosure comprises a transportation apparatus configured to transport an inspected object A in a transportation direction, a first imaging system 10, and a second imaging system 20 arranged on the downstream of the first imaging system 10 in the transportation direction. The first imaging system 10 comprises a first ray generator 11 and first detectors 12, and the second imaging system 20 comprises a second ray generator 21 and second detectors 22. A distance between a ray beam 14 from the first ray generator 11 of the first imaging system 10 and a ray beam 24 from the second ray generator 21 of the second imaging system 20 in the transportation direction is roughly L.

The scanning imaging system further comprises an encoder 30, an encoding counter module 32, and a controller 33. The encoder 30 outputs a signal whenever the transportation apparatus travels a predetermined distance D, and transmits the signal to the encoding counter module 32 via a signal line 31 of the encoder. The encoding counter module 32 is configured to count the output signal of the encoder 30. The controller 33 is connected to the encoding counter module 32 via a communication line 34, and is connected to the first detectors 12 and the second detectors 22 respectively via data communication lines 35 and 36. The controller 33 may be a workstation or an industrial control computer.

The controller 33 acquires, based on a count value of the encoding counter module 32, a correspondence relationship between data in a position of the inspected object A in the transportation direction which is collected by the first imaging system 10 and data in the position of the inspected object A in the transportation direction which is collected by the second imaging system 20. A difference between a count value of the encoder corresponding to the data in the position which is collected by the first imaging system 10 and a count value of the encoder corresponding to the data in the position which is collected by the second imaging system 20 is roughly L/D.

As shown in FIG. 1, the transportation apparatus comprises a transportation belt 40, and the encoder outputs a signal whenever the transportation belt travels a predetermined distance D. The first imaging system 10 may be a DR imaging system (and correspondingly, the ray generator may be a DR X-ray generator, and the detectors may be DR detectors), while the second imaging system 20 may be a CT imaging system (and correspondingly, the ray generator may be a CT X-ray generator, and the detectors may be CT detectors). Alternatively, the first imaging system 10 is a CT imaging system, and the second imaging system 20 is a DR imaging system.

Figure 2:
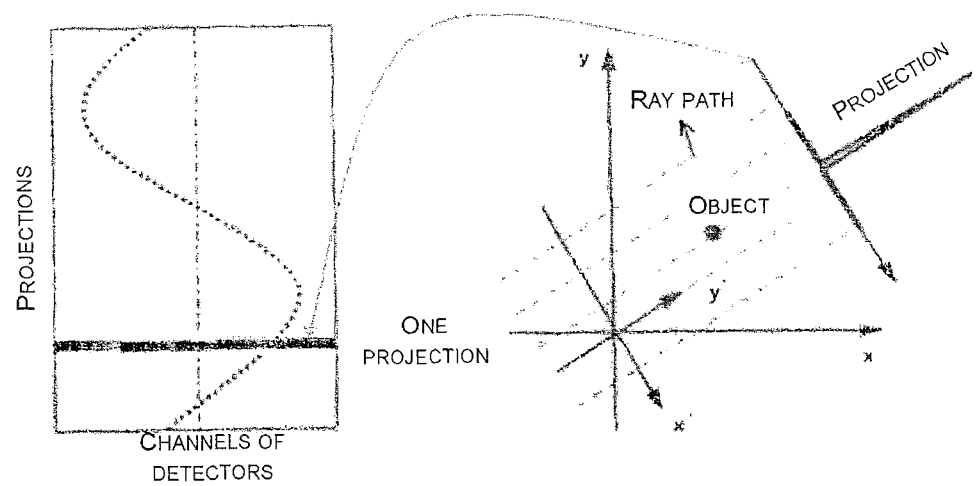
FIG. 2 is a diagram of a mapping relationship between an inspected object and a sinogram (the left diagram) according to an embodiment of the present disclosure.

The DR imaging system acquires data in units of columns. That is, a column of DR data may be collected whenever the belt travels a certain distance, and each column of DR data is bound to a unique belt encoded value. The CT imaging system acquires data in units of projections (the sinogram shown in FIG. 2). In the sinogram, the horizontal axis represents channels of CT detectors, and the vertical axis represents projection angles. Then, a single projection is described as a group of samples on a horizontal line in the sinogram, as shown in FIG. 2. The sinogram is formed by accumulating all projections in different angles of view. Therefore, a single projection is represented by a horizontal line in the sinogram, and projections of each single point form a sine curve in the sinogram. Each CT projection is bound by the imaging system to a unique belt encoded value, and it only needs to associate the column of DR data with the CT projection data one by one.

The object A may be scanned by firstly implementing DR scanning and then CT scanning, or may also be scanned by firstly implementing CT scanning and then DR scanning. The X ray generated by the X-ray generator passes through the object A and then is transmitted onto the corresponding detectors. The detectors transform the energy of the ray into corresponding sinograms, which are encapsulated and organized, and then are transmitted to a controller (for example, the workstation/industrial control computer D) via a data line for data reconstruction and image display.

The encoder 30 is an encoder of a transportation apparatus such as a channel transportation belt, which can count a distance the transportation apparatus such as a transportation belt travels (corresponding to a distance the object A travels) and locate the transportation apparatus. The encoding counter module 32 counts the output signal of the encoder 30, and transmits the count value to the controller 33 such as the workstation/industrial control computer through communication. A DR image and a CT tomographic image displayed on a human-machine interaction interface such as a display should be aligned, i.e., the DR image in a certain position and the CT tomographic image in a certain position displayed on the display should belong to the same position. Therefore, the column of DR data and the CT sinogram data (spiral data) collected by the controller 33 such as the workstation/industrial control computer must comprise corresponding position information of the object (encoding count), to indicate a specific position of the object A corresponding to the corresponding collected data. At the same time, it needs to associate the DR data at the position point with the CT sinogram data at the position point.

The embodiments of the present invention calculates a distance the object A travels on the channel transportation belt using the encoder 30 of the transportation belt, to track the specific position of the object in the channel.

Assume that the first imaging system 10 is a DR imaging system, the second imaging system 20 is a CT imaging system, and the transportation apparatus is the transportation belt 40:

(1) the object A firstly passes through point M, and then passes through point N (vice versa)

(2) an accumulative count value of the belt when the point P of the object A is on the DR optical path (point M) is n1, and the collected DR data package is {Data1}

(3) an accumulative count value of the belt when the point P of the object A is on the CT optical path (point N) is n2, and the collected DR data package is {Data2}

(4) if a change in the count value of the belt encoder 30 is 1, the corresponding belt transportation distance is D(mm).

Then encoding information of the CT data {Data2} is n2, and the data information thereof should correspond to the DR data information (i.e., Data1) in a position where the count value of the encoder is n2−L/D. During imaging on a human-machine interaction interface, alignment of the data images of Data1 and Data2 also achieves alignment of the DR data image and the CT data image. In a practical implementation process, due to system errors in various aspects, the DR data and the CT data cannot be accurately aligned, and can only be roughly aligned. In order to achieve accurate alignment, a difference between the count value of the encoder corresponding to the data in the position collected by the first imaging system 10 and the count value of the encoder corresponding to the data in the position collected by the second imaging system 20 is roughly (L−Δ)/D+d, wherein Δ is a compensation value, and the second imaging system 20 starts to collect data from a position where a distance between the forefront of the inspected object and the ray beam from the second ray generator of the second imaging system 20 is Δ, and d is a correction value, and is equal to a count value of the encoder for the inspected object from the time when the second imaging system 20 starts to collect data to the time when the forefront of the inspected object arrives at the ray beam 24 from the second ray generator of the second imaging system 20.

The compensation value Δ is used to ensure that the second imaging system 20 collects complete data of the inspected object, instead of starting to collect data from the middle of the inspected object. With respect to the correction value d, the corresponding count value of the encoder when the forefront of the inspected object arrives at the ray beam 24 of the second ray generator of the second imaging system 20 may be determined from the data obtained by the second imaging system.

In a case that the second imaging system 20 is a CT imaging system, the correction value d may be obtained from a count value of the encoder corresponding to the projection data of a non-object part in the sinogram obtained by the CT imaging system. After the CT data of the forefront of the object A is found (i.e., a first circle of sinogram of the object which is distinguished through the information of the belt encoding value), a position of the object in the first circle of sinogram is obtained by recognizing a sinogram of the head, and a value of the position is used as a correction value d for alignment of the DR image data and the CT image data. In this way, an accurate alignment effect can be achieved. Then the encoding information of the CT data {Data2} is n2, and the data information thereof should correspond to DR data information (i.e., Data1) in a position where the count value of the encoder is n2−((L−Δ)/D+d).

Although the embodiments of the present disclosure are described, the present disclosure is not limited to the above embodiments. For example, the transportation apparatus may be any transportation apparatus suitable to transport an inspected object, and the encoder may also be any suitable encoder, as long as the transportation position of the inspected object can be obtained.

The foregoing detailed description has set forth various embodiments of scanning imaging systems via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. A scanning imaging system, comprising:
   a transportation apparatus configured to transport an inspected object in a transportation direction;
   a first imaging system comprising a first ray generator and first detectors;
   a second imaging system arranged on the downstream of the first imaging system in the transportation direction, the second imaging system comprising a second ray generator and second detectors, wherein a distance between a ray beam from the first ray generator of the first imaging system and a ray beam from the second ray generator of the second imaging system in the transportation direction is roughly L;
   an encoder configured to output a signal whenever the transportation apparatus travels a predetermined distance D;
   an encoding counter module configured to count the output signal of the encoder; and
   a controller configured to acquire, based on a count value of the encoding counter module, a correspondence relationship between data in a position of the inspected object in the transportation direction which is collected by the first imaging system and data in the position of the inspected object in the transportation direction which is collected by the second imaging system, wherein a difference between a count value of the encoder corresponding to the data in the position which is collected by the first imaging system and a count value of the encoder corresponding to the data in the position which is collected by the second imaging system is roughly L/D.

2. The scanning imaging system according to claim 1, wherein,
   the transportation apparatus comprises a transportation belt, and the encoder outputs a signal whenever the transportation belt travels a predetermined distance D.

3. The scanning imaging system according to claim 1, wherein,
   the first imaging system is a Digital Radiography (DR) imaging system, and the second imaging system is a Computed Tomography (CT) imaging system.

4. The scanning imaging system according to claim 1, wherein,
   the first imaging system is a CT imaging system, and the second imaging system is a DR imaging system.

5. A scanning imaging system, comprising:
   a transportation apparatus configured to transport an inspected object in a transportation direction;
   a first imaging system comprising a first ray generator and first detectors;

a second imaging system arranged on the downstream of the first imaging system in the transportation direction, the second imaging system comprising a second ray generator and second detectors, wherein a distance between a ray beam from the first ray generator of the first imaging system and a ray beam from the second ray generator of the second imaging system in the transportation direction is roughly L;

an encoder configured to output a signal whenever the transportation apparatus travels a predetermined distance D;

an encoding counter module configured to count the output signal of the encoder; and a controller configured to acquire, based on a count value of the encoding counter module, a correspondence relationship between data in a position of the inspected object in the transportation direction which is collected by the first imaging system and data in the position of the inspected object in the transportation direction which is collected by the second imaging system, wherein a difference between the count value of the encoder corresponding to the data in the position collected by the first imaging system and the count value of the encoder corresponding to the data in the position collected by the second imaging system is roughly $(L-\Delta)/D+d$, wherein $\Delta$ is a compensation value, and the second imaging system starts to collect data from a position where a distance between the forefront of the inspected object and the ray beam from the second ray generator of the second imaging system is $\Delta$, and d is a correction value, and is equal to a count value of the encoder for the inspected object from the time when the second imaging system starts to collect data to the time when the forefront of the inspected object arrives at the ray beam from the second ray generator of the second imaging system.

6. The scanning imaging system according to claim 5, wherein, the transportation apparatus comprises a transportation belt, and the encoder outputs a signal whenever the transportation belt travels a predetermined distance D.

7. The scanning imaging system according to claim 5, wherein, the first imaging system is a Digital Radiography (DR) imaging system, and the second imaging system is a Computed Tomography (CT) imaging system.

8. The scanning imaging system according to claim 5, wherein, the first imaging system is a CT imaging system, and the second imaging system is a DR imaging system.

9. The scanning imaging system according to claim 7, wherein, the correction value d is obtained from a count value of the encoder corresponding to the projection data of a non-object part in the sinogram obtained by the CT imaging system.

\* \* \* \* \*